United States Patent
McEvoy et al.

(10) Patent No.: US 10,704,706 B2
(45) Date of Patent: Jul. 7, 2020

(54) REFLEXIVE VALVE PRESERVATION AND ACTUATION SYSTEM AND METHOD

(71) Applicant: GE Oil & Gas Pressure Control LP, Houston, TX (US)

(72) Inventors: Travis Kyle McEvoy, Houston, TX (US); Lloyd Cheatham, Lake Jackson, TX (US); Keith Adams, Houston, TX (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 138 days.

(21) Appl. No.: 15/970,035

(22) Filed: May 3, 2018

(65) Prior Publication Data

US 2018/0320798 A1 Nov. 8, 2018

Related U.S. Application Data

(60) Provisional application No. 62/500,869, filed on May 3, 2017.

(51) Int. Cl.
*F16K 31/122* (2006.01)
*F16K 3/02* (2006.01)
*F16K 11/07* (2006.01)

(52) U.S. Cl.
CPC ........ *F16K 31/1221* (2013.01); *F16K 3/0254* (2013.01); *F16K 31/122* (2013.01); *F16K 11/07* (2013.01); *Y10T 137/3112* (2015.04); *Y10T 137/8597* (2015.04); *Y10T 137/86558* (2015.04)

(58) Field of Classification Search
CPC ... F16K 3/0254; F16K 31/1221; F16K 31/122
USPC .............................. 137/205.5, 564.5, 625.18
See application file for complete search history.

(56) References Cited

U.S. PATENT DOCUMENTS

| 1,257,070 | A | * | 2/1918 | Discher | ............... | F16K 11/0655 |
| | | | | | | 137/625.18 |
| 1,287,258 | A | * | 12/1918 | Discher | ............... | F16K 11/0655 |
| | | | | | | 137/625.18 |
| 2,841,170 | A | * | 7/1958 | Kalsey | .................... | F16K 17/36 |
| | | | | | | 137/410 |
| 2019/0249785 | A1 | * | 8/2019 | Son | .......................... | F16K 1/34 |

* cited by examiner

*Primary Examiner* — Umashankar Venkatesan
(74) *Attorney, Agent, or Firm* — Hogan Lovells US LLP (57) ABSTRACT

Embodiments of the present disclosure include a valve assembly including a supply housing with a first bore and an injectable housing coupled to the supply housing with a second bore. The valve assembly further includes a piston extending through at least a portion of the first and second bores, the piston being reciprocable axially along a longitudinal axis. The valve assembly also includes a first inlet at a first end of the supply housing for directing a working fluid toward a first end of the piston. The valve assembly includes a second inlet extending through the injectable housing toward a cavity that receives an injectable material. The valve assembly also includes a second outlet at a second end of the injectable housing that directs the injectable material out of the injectable housing as the piston moves axially along the longitudinal axis.

20 Claims, 9 Drawing Sheets

REFLEXIVE VALVE PRESERVATION AND ACTUATION SYSTEM AND METHOD

CROSS REFERENCE TO RELATED APPLICATION

This application claims priority to and the benefit of: co-pending U.S. Provisional Application Ser. No. 62/500,869 filed May 3, 2017, titled "Reflexive Valve Preservation and Actuation System and Method," the full disclosure of which is hereby incorporated herein by reference in its entirety for all purposes.

BACKGROUND

1. Field of Invention

This disclosure relates in general to valve assemblies, and in particular, to preservation techniques for multi-cycle valves.

2. Description of the Prior Art

In oil and gas production, various tubulars, valves, and instrumentation systems may be used to direct fluids into and out of a wellhead. For example, in hydraulic fracturing operations, frac trees may be arranged at the wellhead and include pipe spools and various valves to direct hydraulic fracturing fluid into the wellbore. The valves arranged in these frac trees may be cycled repeatedly during operation. Fracturing fluid may include particulate matter, such as sand, which in certain embodiments may enter internal components of the valves. As a result, the repeated cycling of the valves between the open and closed positions may damage valve components. It is now recognized that improved systems and methods for protecting valve components are desired.

SUMMARY

Applicants recognized the problems noted above herein and conceived and developed embodiments of systems and methods, according to the present disclosure, for valve assemblies.

In an embodiment a valve assembly includes a supply housing comprising a first bore. The valve assembly also includes an injectable housing coupled to the supply housing and comprising a second bore, the first bore and the second bore being axially aligned. The valve assembly further includes a piston extending through at least a portion of the first and second bores, the piston being reciprocable axially along a longitudinal axis of the first and second bores. The valve assembly also includes a first inlet at a first end of the supply housing, the first inlet directing a working fluid toward a first end of the piston. The valve assembly includes a second inlet extending through the injectable housing toward a cavity of the second bore, the cavity receiving an injectable material. The valve assembly also includes a second outlet at a second end of the injectable housing, the second outlet directing the injectable material out of the injectable housing as the piston moves axially along the longitudinal axis to drive the injectable material out of the cavity.

In another embodiment a valve assembly for injecting an injectable material into at least a portion of a valve includes a supply housing. The supply housing includes a first inlet at a first end, the first inlet receiving a working fluid, a second end opposite the first end, and a first outlet between the first end and the second end, the first outlet directing the working fluid out of the supply housing. The valve assembly also includes an injectable housing. The injectable housing includes a first end coupled to the supply housing at the second end, a second outlet at a second end, a second inlet between the first end and the second end, and a cavity formed within a body of the injectable housing, the cavity receiving an injectable material via the second inlet. The valve assembly also includes a piston arranged in at least a portion of both the supply housing and the injectable housing, the piston moving axially along a longitudinal axis, wherein the working fluid is configured to move the piston toward the second end such that the piston drives the injectable material out of the injectable housing via the second outlet.

In an embodiment a valve assembly for injecting an injectable material into at least a portion of a valve includes a supply housing. The supply housing includes a first inlet at a first end, the first inlet receiving a working fluid. The supply housing also includes a second end opposite the first end. The supply housing further includes a first outlet directing the working fluid out of the supply housing. The valve assembly also includes an injectable housing. The injectable housing includes a first end coupled to the supply housing at the second end. The injectable housing further includes a second outlet at a second end. The injectable housing includes a second inlet between the first end and the second end. The injectable housing also includes a cavity formed within a body of the injectable housing, the cavity receiving an injectable material via the second inlet. The valve assembly also includes a piston arranged in at least a portion of both the supply housing and the injectable housing, the piston blocking the first outlet until the working fluid applies a force to move the piston at least a predetermined distance along an axis.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure include a reflexive valve preservation and actuation system (RVPAS) that may be used in conjunction with a valve, such as an actuated valve, to preemptively apply an injectable before the valve is cycled. In various embodiments, the injectable includes a grease or oil that may be injected into a cavity that may be contaminated by a substance, such as sand from a hydraulic fracturing fluid. The injectable may be injected into the cavity prior to cycling the valve, thereby driving the contaminants away from certain valve components, which may improve the life of the valve components. In various embodiments, the RVPAS includes a piston-cylinder arrangement that utilizes a working fluid, such as an actuating fluid utilized to drive an actuated valve, to inject the injectable into the valve. For example, compressed air may be used to drive the piston and push or otherwise inject the injectable into the valve. The same compressed air may also be used to actuate the actuator of the valve, thereby reducing the number of components or fittings at the well site. In various embodiments, the RVPAS may include one-way valves or controllers to selectively utilize different components. For example, the RVPAS may be set to inject the injectable each time the valve is cycled. Furthermore, the RVPAS may be set to only inject the injectable without cycling the valve or to cycle the valve without injecting the injectable. In this manner, maintenance operations may commence without cycling the valve and, furthermore, the valve may commence normal operations without injecting the injectable at each instance of cycling. In various embodiments, the RVPAS may be integrated into the valve and/or actuator. Furthermore, in various embodiments, the RVPAS may be an auxiliary component that may be adapted to work with existing valves.

Figure 1:
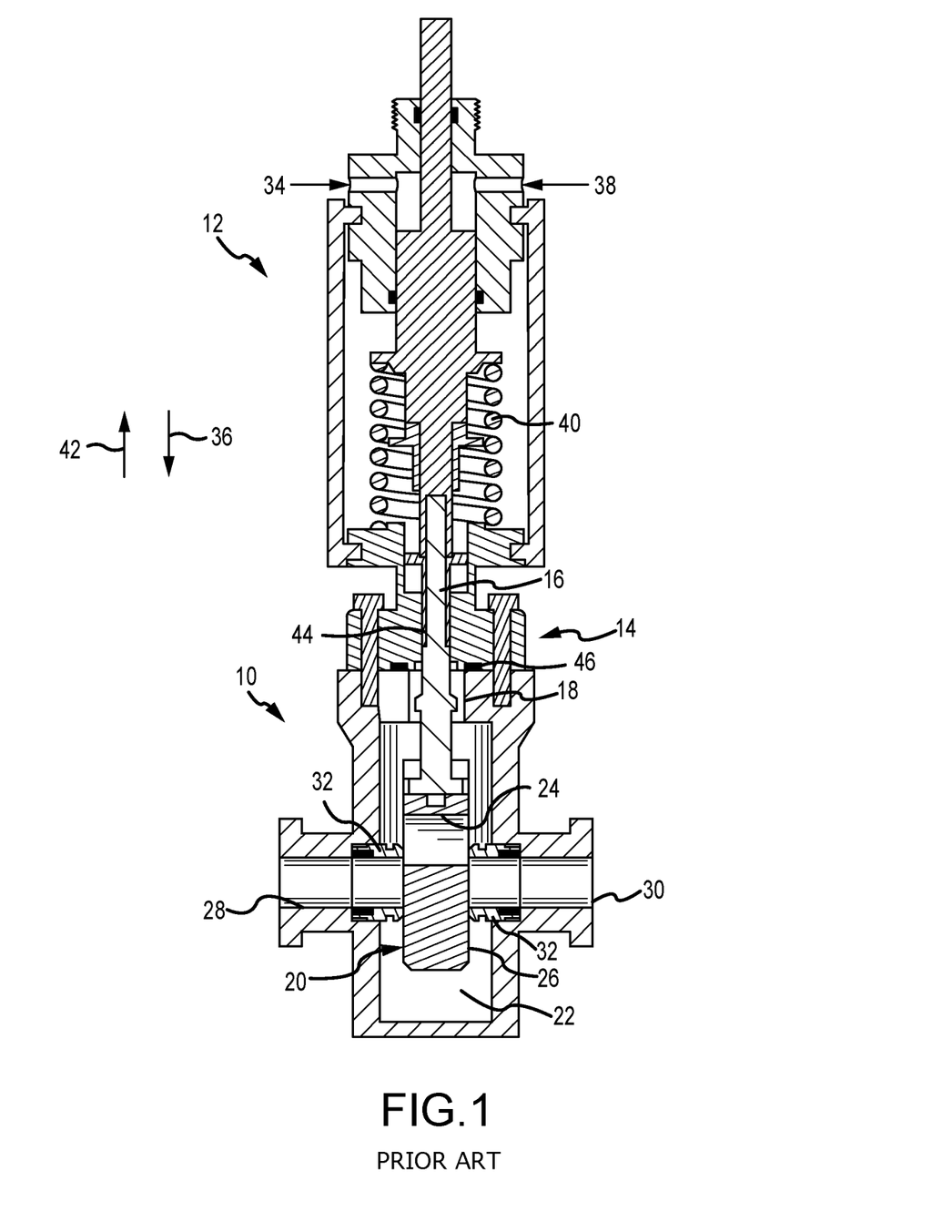
FIG. 1 is a schematic cross-sectional view of an embodiment of a valve having an actuator, in accordance with embodiments of the present disclosure

FIG. 1 is a cross-sectional side elevation view of an embodiment of a valve 10 that includes an actuator 12 coupled to a bonnet 14. The illustrated actuator 12 is coupled to a valve stem 16 that extends through a central bore 18 and couples to a valve member 20 arranged within a chamber 22. The illustrated valve member 20 includes a passage 24 and a block 26. As shown, fluid (e.g., gas, liquid, solid, or a combination thereof) may enter the valve 10 through an inlet passage 28 and engage the valve member 20 en route to an outlet passage 30. In the illustrated embodiment, the valve member 20 is transitioning between an open position, in which the passage 24 is substantially aligned with the inlet passage 28 and the outlet passage 30, and a closed position, in which the block 26 is substantially aligned with the inlet passage 28 and the outlet passage 30.

In the illustrated embodiment, the valve member 20 may seal against valve seats 32 to block the flow of fluid through the valve. Movement of the valve member 20, via the stem 16 is driven by the actuator 12. In various embodiments, the actuator 12 may be hydraulically actuated, pneumatically actuated, electrically actuated, or the like. For example, a working fluid (e.g., gas, liquid, solid, or combination thereof) may enter a flow path 34 to drive the piston 16 in a downward direction 36 to open the valve 10. Furthermore, the working fluid may be directed out of the actuator 12 via a flow path 38, which would enable a biasing member 40, in the illustrated embodiment, to drive the valve stem 16 in an upward direction 42 to move the valve to a closed position.

In various embodiments, the fluid traveling through the valve 10 may include particulates, such as proppant used during hydraulic fracturing operations. The fluid may migrate into parts of the valve 10 during operation. For example, the fluid may migrate toward various seals 44, 46. Over time, the particulates may degrade certain valve components, which may decrease the life of the valve 10 and/or decrease time periods between maintenance. Accordingly, systems and methods of the present disclosure are directed toward a reflexive valve preservation and actuation system (RVPAS) that may be used to inject an injectable, such as grease or oil, into an area of the valve 10 to flush particulates and other contaminants.

Figure 2:
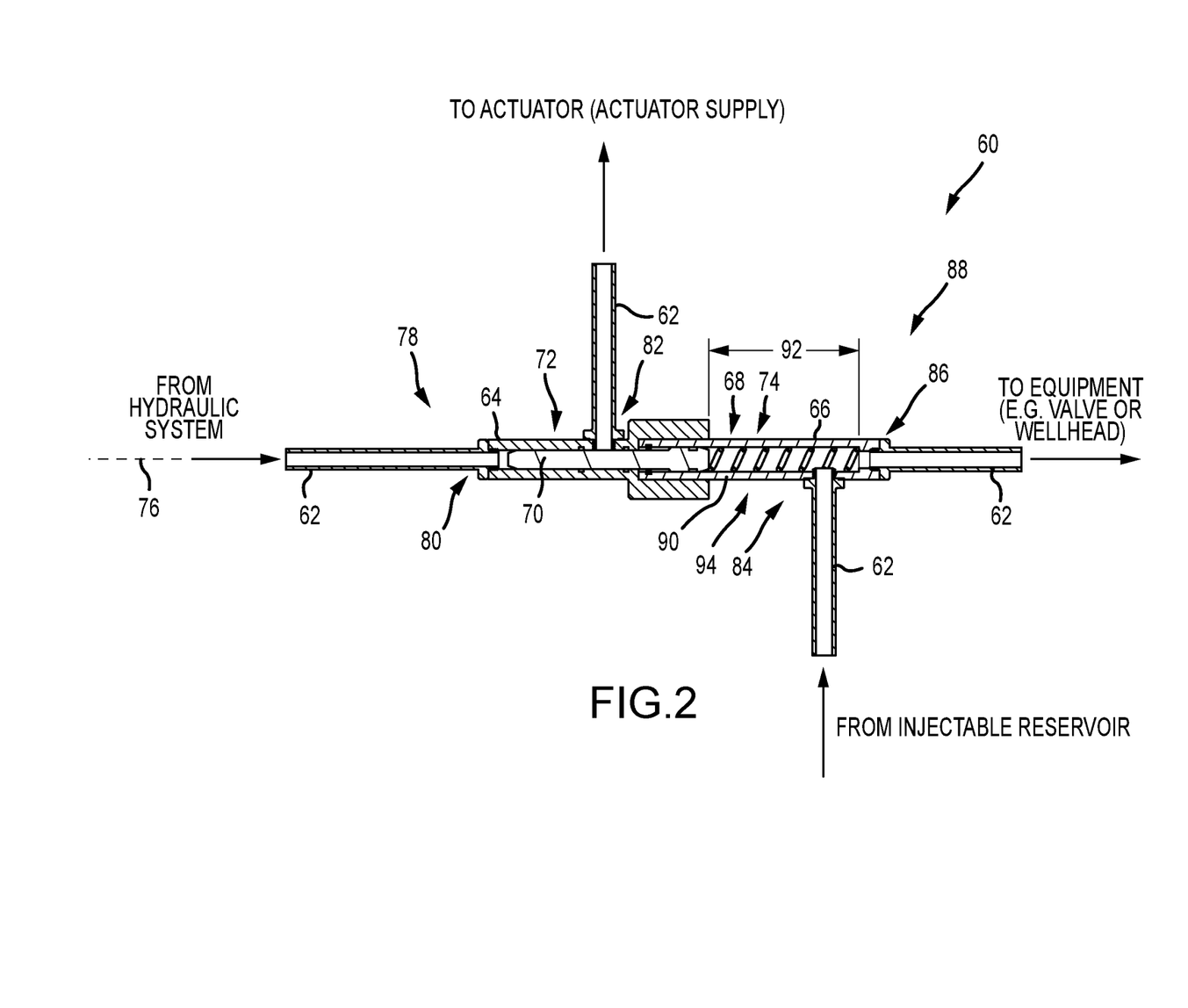
FIG. 2 is a schematic cross-sectional side view of an embodiment of a reflexive valve preservation and actuation system (RVPAS), in accordance with embodiments of the present disclosure.

FIG. 2 is a schematic cross-sectional elevational view of an embodiment of the RVPAS 60 including a plurality of fluid conducts 62 extending from orifices of the RVPAS 60. In the illustrated embodiment, the RVPAS 60 includes a supply housing 64 coupled to an injectable housing 66. In various embodiments, the supply housing 64 includes a recessed opening 68 to receive at least a portion of the injectable housing 66. It should be appreciated that there may be seals or other coupling members, such as threads, to facilitate connection between the supplying housing 64 and the injectable housing 66. For example, the recessed opening 68 may include threads that mate with threads on an outer diameter of the injectable housing 66 to secure the injectable housing 66 to the supplying housing 64.

The illustrated embodiment includes a piston rod 70 that extends through a bore 72 of the supply housing 64 and a bore 74 of the injectable housing 66. As will be described below, the piston rod 70 is configured to translate axially (e.g., reciprocate) along an axis 76. The reciprocation enables a driving fluid, such as a hydraulic fluid, air, or the like, to activate an actuator coupled to the valve. That is, the illustrated position of the piston rod 70 blocks at least one conduit 62 coupled to the supply housing 64. Reciprocation axially along the axis 76 will move the piston rod 70 such that the conduit 62 is no longer blocked. Furthermore, as will be described below, reciprocation of the piston rod 70 may also drive an injectable out of the injectable housing 66 toward a predetermined cavity or location within the valve 10.

The RVPAS 60 illustrated in FIG. 2 includes a plurality of ports to receive and direct a variety of fluids. In various embodiments, a first end 78 of the supply housing 64 includes a first inlet 80, which may be from a hydraulic system. The hydraulic system may be pneumatic (e.g., air, compressed gases, or the like) or use a working fluid, such as a hydraulic fluid. As used herein, the system used to actuate the valves and/or the RVPAS 60 will be referred to as a driving fluid. A first outlet 82 is arranged downstream, relative to the flow of the driving fluid, and directs the driving fluid into the conduit 62 toward the actuator 12 of the valve 10. The driving fluid enables the actuator 12 to cycle the valve 10 between the open and closed positions. It should be appreciated that while the illustrated embodiment depicts the first inlet 80 and the first outlet 82 on an end and top of the RVPAS 60, respectively, that in other embodiments the first inlet 80 and the first outlet 82 may be arranged at different locations.

In various embodiments, the RVPAS 60 further includes ports located on the injectable housing 66. For example, in the embodiment illustrated in FIG. 2, a second inlet 84 is arranged upstream, relative to the flow of the injectable, of a second outlet 86 on a second end 88 of the RVPAS 60. In the illustrated embodiment, the second inlet 84 receives an injectable from an injectable reservoir. In various embodiments, the injectable is a grease, an oil, a sealant, or the like. The injectable reservoir may be a tote or other container that holds a predetermined quantity of injectable. The second inlet 84 enables the injectable to be positioned within the injectable housing 66 to thereafter be driven toward a predetermined location of the valve 10 via reciprocation of the piston rod 70. The second outlet 86 directs the injectable toward a valve component, such as a bearing, seal, or the like. As a result, the injectable may be directed toward a particularly selected component, for example via the conduit 62. As described above with respect to the first inlet 80 and the first outlet 82, the depicted locations of the ports may different in other embodiments. For example, the second inlet 84 may be arranged on a top portion of the injectable housing 66 to enable gravity feed of the injectable into the injectable housing 66. Furthermore, the position of other outlets and inlets may be switched due to design conditions and the like. Additionally, various tubing and piping structures may be coupled to the RVPAS 60 to make up with the various supplies and fluid destinations.

In the embodiment illustrated in FIG. 2, the injectable housing 66 further includes a resilient member 90 (e.g., biasing member), which is depicted as a spring. The illustrated spring is a compression spring that includes a predetermined spring constant associated with a force to compress the spring. In operation, the illustrated resilient member 90 will bias the piston rod 70 into the illustrated position such that a length 92 of a cavity 94 of the injectable housing 66 is larger than a second length (not depicted and described below) when the piston rod 70 strokes. In other words, the illustrated position of the piston rod 70 may be described as top dead center and the cavity 94 may be described as open or uncompressed. In the illustrated embodiment, the compression spring will bias the piston rod 70 such that the cavity 94 is uncompressed and will be compressed when a sufficient, predetermined force acts on the resilient member 90. It should be appreciated that in other embodiments the resilient member may be an extension spring. That is, the resilient member 90 may be arranged at an opposite end of the injectable housing 66 or within the supply housing 64 and may bias the piston rod 70 into the illustrated position. Upon receipt of a sufficient force, the extension spring may extend and then draw the piston rod 70 backed into the position where the cavity 94 is uncompressed. Furthermore, the resilient member 90 may not be a spring and may be any other component that may be used to bias the piston rod 70 toward a predetermined location.

Figure 3:
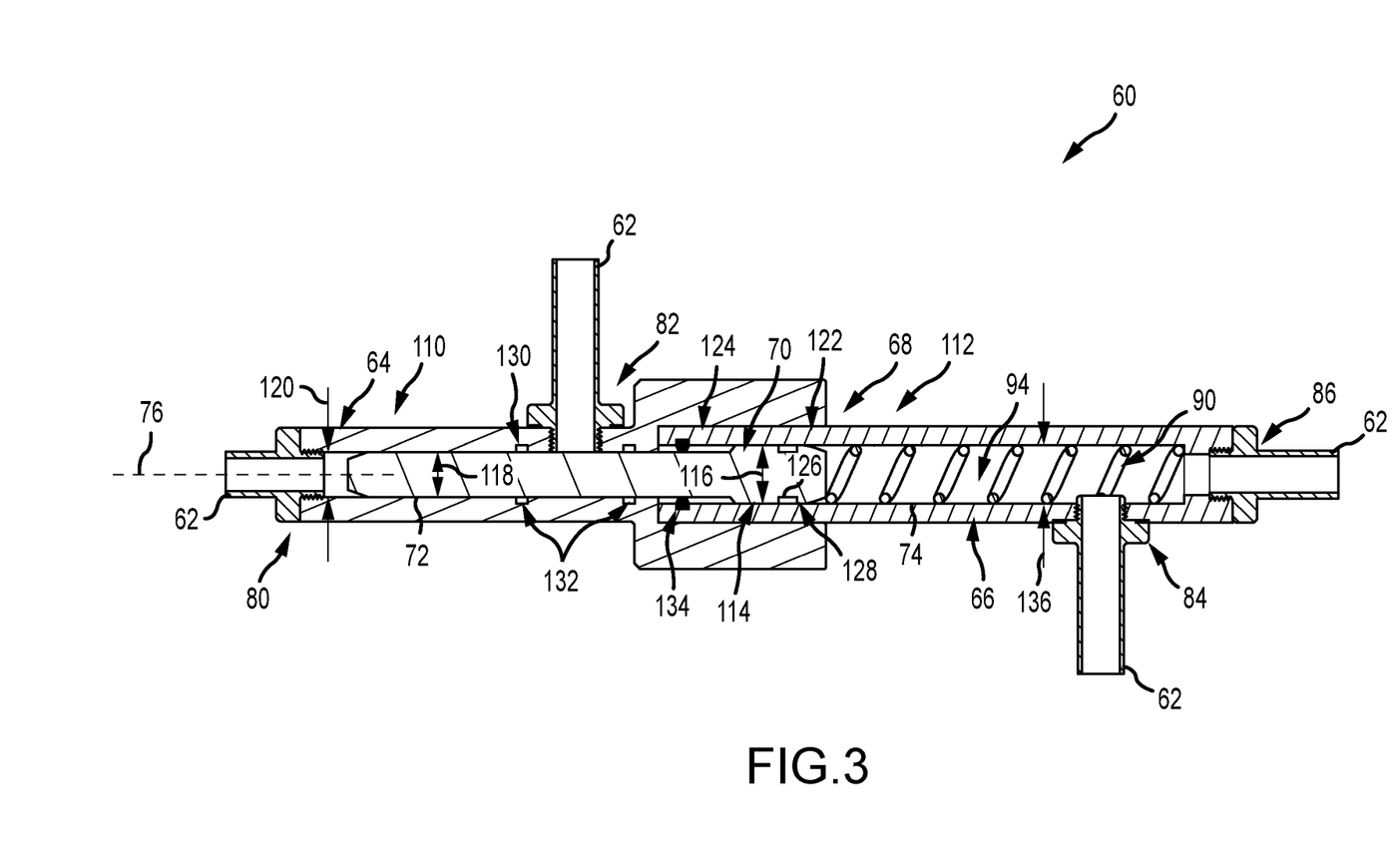
FIG. 3 is a schematic cross-sectional side view of the RVPAS of FIG. 1, in accordance with embodiments of the present disclosure.

FIG. 3 is a detailed schematic cross-sectional view of an embodiment of the RVPAS 60. As described above, fluid conduits 62 are coupled to the ports arranged along the RVPAS 60 to receive and direct fluid. The supply housing 64 receives the injectable housing 66 within the recessed opening 68. However, it should be appreciated that, in other embodiments, a different coupling mechanism may be utilized to connect the supply housing 64 to the injectable housing 66. The illustrated piston rod 70 extends through respective bores 72, 74 and is arranged to reciprocate along the axis 76. Furthermore, as described above, the injectable housing 66 includes the resilient member 90 for biasing the piston rod 70 into the illustrated position where the cavity 94 is uncompressed. As will be described below, the cavity 94 receives the injectable from the second inlet 84.

In the embodiment illustrated in FIG. 3, the piston rod 70 includes a first end 110 and a second end 112. The second end 112 further includes an expanded portion 114 that has an outer diameter 116 that is larger than an outer diameter 118 of the first end 110. Furthermore, the outer diameter 116 of the expanded portion 114 is larger than a diameter 120 of the bore 72. As a result, the piston rod 70 cannot retract into the supply housing 64 beyond a predetermined distance. The illustrated expanded portion 114 includes a head section 122 and a body section 124 with a gap 126 for receiving a dynamic seal 128. The dynamic seal 128 moves axially with the piston rod 70 as the piston rod 70 reciprocates along the axis 76. In various embodiments, the dynamic seal 128 is formed from an elastomer material, a metallic material, a plastic material, or any other reasonable material.

As illustrated, the piston rod 70 is at least partially positioned within the supply housing 64. The supplying housing 64 includes recesses 130 for static seals 132. The static seals 132 may not move along with the piston rod 70. As described above, the static seals 132 may be formed form a variety of materials. In various embodiments, the seals 128, 132 may, at least in part, facilitate centralizing and support of the piston rod 70 as the piston rod 70 reciprocates along the axis 76 within the bores 72, 74.

In various embodiments, the piston rod 70 also interacts with a wiper 134 positioned within the injectable housing 66. In the illustrated embodiment, the wiper 134 is upstream of the dynamic seal 128. It should be appreciated that the wiper 134 may be an annular projection into the injectable housing 66. In operation, the wiper 134 cleans the outer diameter of the piston rod 70, thereby removing debris that may accumulate due to the reciprocation of the piston rod 70 within the bores 72, 74. For example, the injectable may migrate upward along the piston rod 70 and/or the piston rod 70 may reciprocate along a section of the cavity 94 that has some residual injectable along the wall. This injectable may then be transported back toward the supply housing 64. It may be undesirable for the injection to be transported to the actuator 12 along the first outlet 82. Accordingly, the wiper 134 may act as a barrier for accumulated debris and injectable.

In the embodiment illustrated in FIG. 3, a diameter 136 of the bore 74 of the injectable housing 66 is larger than the diameter 120 of the bore 72 of the supply housing 64. This larger diameter 136 may accommodate the increased diameter 116 of the expanded portion 114. It should be appreciated that in other embodiments the respective diameters may be the same size or the diameter of the injectable housing 66 may be smaller than the diameter of the supply housing 64. Furthermore, the diameter 136 may be particularly selected to accommodate a volume of injectable that may be positioned within the cavity 94. For example, in applications where a smaller amount of injectable is anticipated, the injectable housing 66 may have a smaller diameter or be shorter to accommodate a smaller quantity of injectable. The relative sizes of the supply housing 64 and injectable housing 66, such as the cavities, diameters, lengths, and the like will be particularly selected based on the application.

Figure 4:
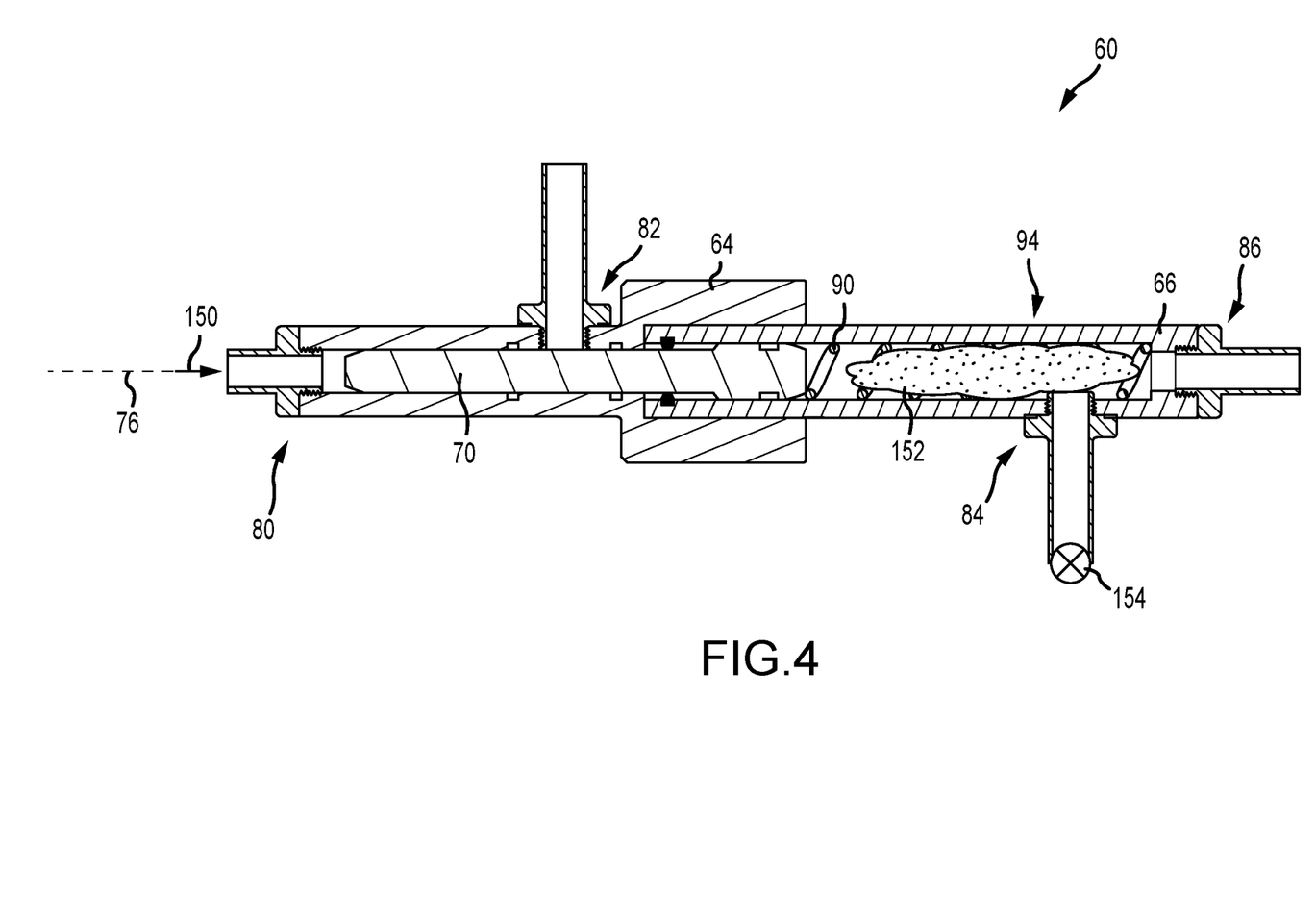
FIG. 4 is a schematic cross-sectional side view of the RVPAS of FIG. 1, in which a driving fluid is activated, in accordance with embodiments of the present disclosure.

FIG. 4 is a schematic cross-sectional view of an embodiment of the RVPAS 60 in which the piston rod 70 is arranged such that the cavity 94 is uncompressed. In the illustrated embodiment, driving fluid from the hydraulic supply is directed toward the piston rod 70 via the first inlet 80, as illustrated by the arrow 150. In the illustrated embodiment, the piston rod 70 blocks the first outlet 82, and as a result, the force of the driving fluid acts on the piston rod 70. As will be described below, this force moves the piston rod along the axis 76 until the first outlet 82 is at least partially unobstructed. The illustrated configuration provides a delay between injection of the injectable and activation of the actuator 12, and as a result, the injectable is directed toward the valve 10 before the valve 10 is cycled, thereby providing protection to components within the valve 10 before movement of the valve 10 is initiated.

In various embodiments, an injectable 152 is positioned within the cavity 94. As will be described below, the injectable 152 may be drawn into the cavity 94 in a variety of ways, such as by a vacuum pressure within the cavity 94, gravity feed, a fluid mover, and the like. It should be appreciated that the injectable 152 shown in FIG. 4 is for illustrate purposes and that the injectable 152 may substantially fill the entire cavity 94 or may fill less of the cavity 94. Furthermore, the injectable 152 may be metered such that a predetermined quantity is directed into the cavity 94. As illustrated in FIG. 4, the resilient member 90 (e.g., spring) is fully extended and biasing the piston rod 70 toward the supply housing 64. As a result, the force applied to the piston rod 70 by the driving fluid is configured to be sufficient to drive the injectable 152 out of the injectable housing 66 and also compress the resilient member 90 such that the driving fluid can enter the first outlet 82.

In the illustrated embodiment, a restricted flow valve 154 is arranged proximate the second inlet 84 between the injectable housing 66 and an injectable reservoir. The restricted flow valve 154 restricts the flow of fluid through a line in a single direction, such as a check valve. In the illustrated embodiment, the restricted flow valve 154 would enable flow into the injectable housing 66, but block flow back into the injectable reservoir, for example, due to the force of the piston rod 70. Moreover, in embodiments where the fluid reservoir is gravity fed into the injectable housing 66, the restrictive flow valve 154 may be set such that the force of gravity alone would not be sufficient to flow injectable 152 into the injectable housing 66.

Figure 5:
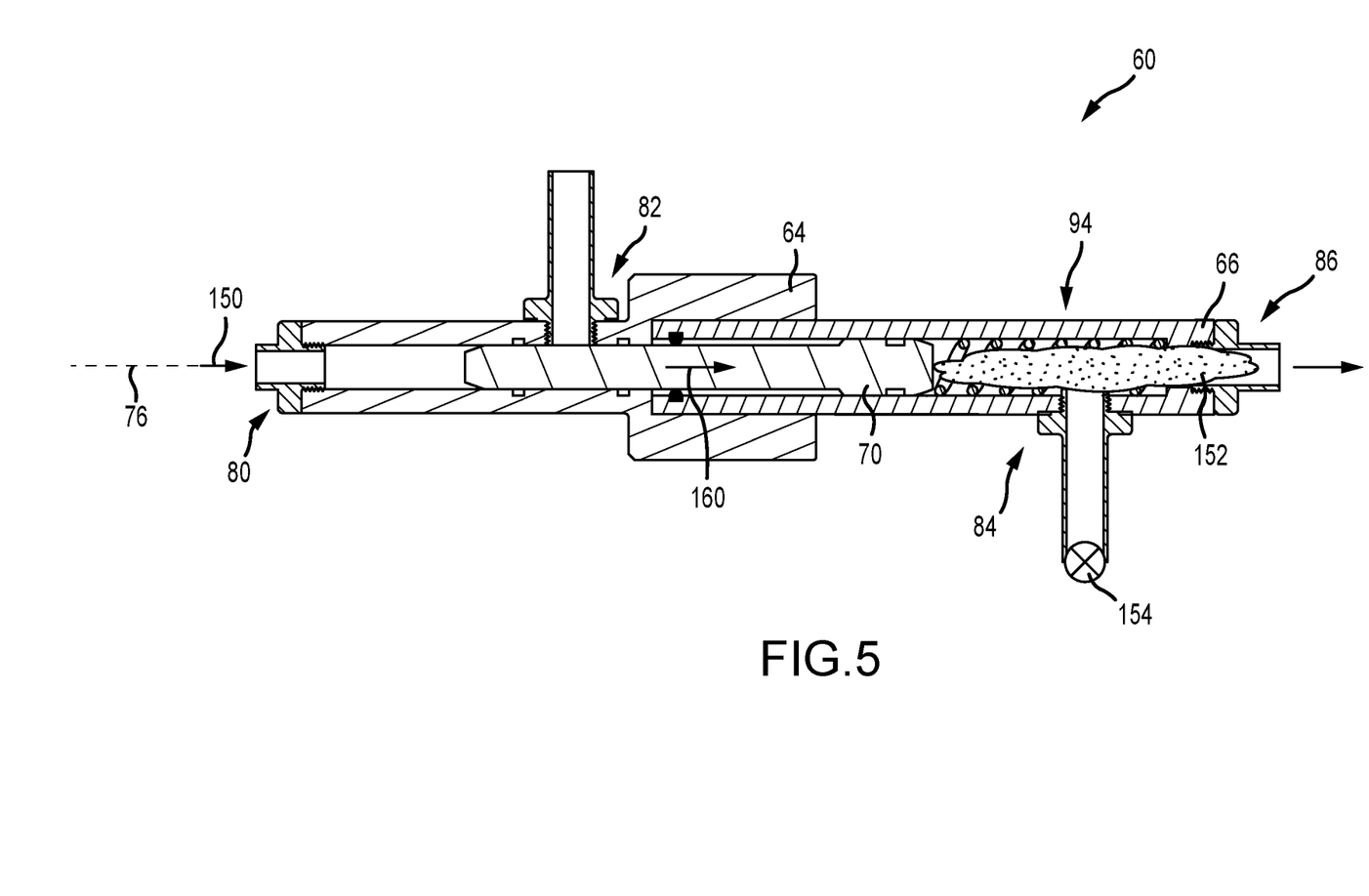
FIG. 5 is a schematic cross-sectional side view of the RVPAS of FIG. 1, in which a piston rod is undergoing a stroke, in accordance with embodiments of the present disclosure.

FIG. 5 is a schematic cross-sectional view of an embodiment of the RVPAS 60 in which the piston rod 70 is moving along the axis 76 in a first direction 160. In the illustrated embodiment, the driving fluid enters the supply housing 64 at the first inlet 80 and applies a pressure to the piston rod 70 to drive the piston rod toward the second outlet 86, in the first direction 160, thereby displacing the injectable 152 positioned within the cavity 94 to the second outlet 86. It should be appreciated that the resilient member 90 has been removed for clarity. However, in operation, movement of the piston rod 70 in the first direction 160 will compress the resilient member 90 (in embodiments where the resilient member 90 is a compressive spring). Furthermore, in the illustrated embodiment, the restricted flow valve 154 blocks the flow of the injectable 152 back toward the injectable reservoir. As such, the injectable 152 is directed toward the valve 10 where it may be used to grease or lubricate portions of the valve 10 to improve functionality or longevity.

In the illustrated embodiment, the injectable 152 is being driven toward the second outlet 86 while the first outlet 82 is blocked by the piston rod 70. That is, there is a delay between the activation of the actuator 12 and injection of the injectable 152, thereby providing time for the injectable 152 to be positioned within the valve 10 and to interface with the components utilizing the injectable 152. In certain embodiments, the valve 10 may receive injectable without actuating the valve 10. For example, the driving fluid pressure may be insufficient to drive the piston rod 70 far enough toward the second outlet 86 to unblock the first outlet 82. Additionally, in certain embodiments, the first outlet 82 may include a control valve that blocks flow to the actuator 12 while enabling injection of the injectable 12. For example, the control valve may be in a closed position when the driving fluid is introduced in the first inlet 82, thereby enabling movement of the piston rod 70 but not activation of the actuator 12. In various embodiments, a vent or flow back line may be included to direct the driving fluid away from the RVPAS 60. In this manner, the valve 10 may be treated with the injectable 152 without cycling the valve 10.

Figure 6:
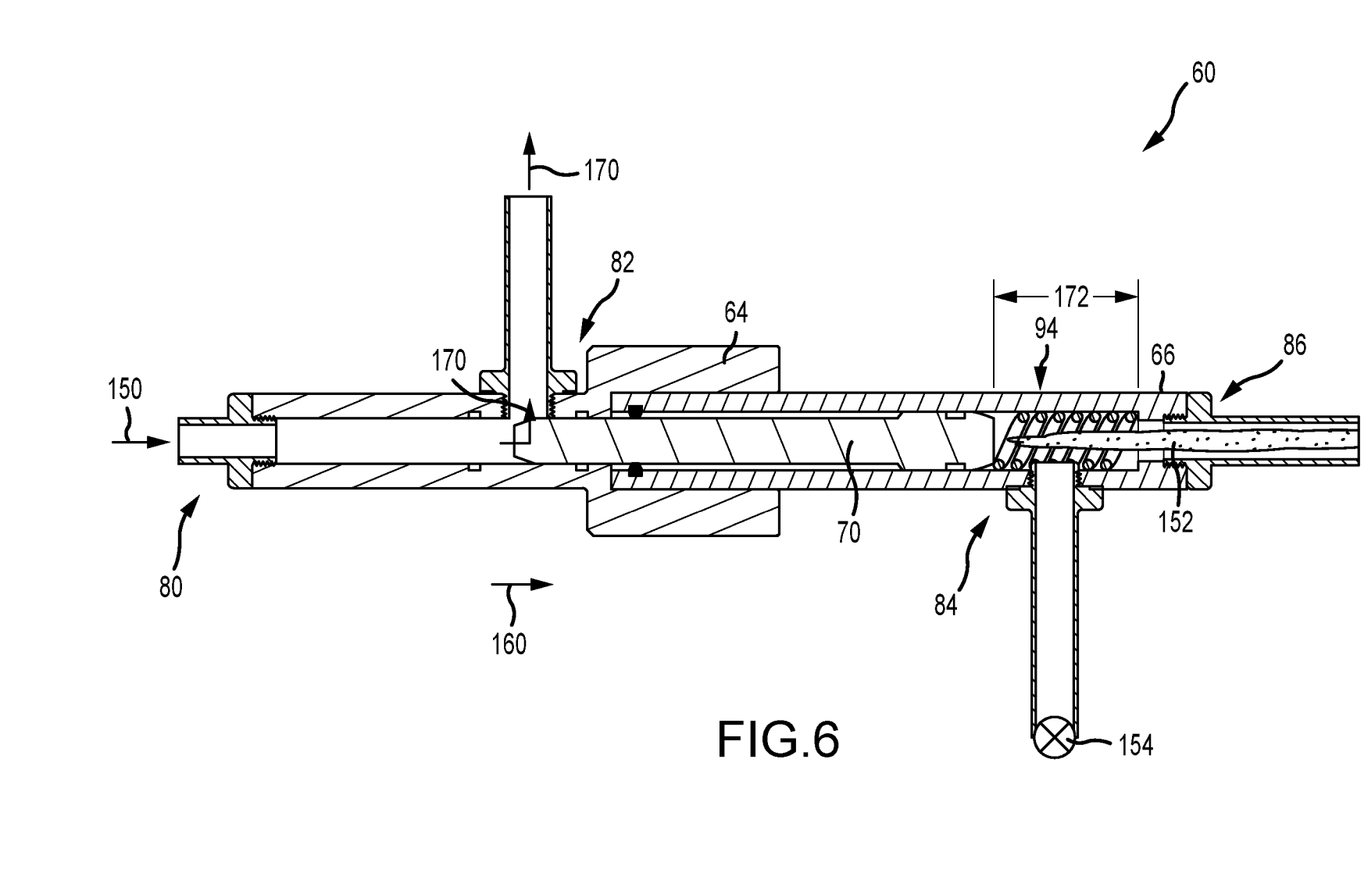
FIG. 6 is a schematic cross-sectional side view of the RVPAS of FIG. 1, in which driving fluid is directed toward an actuator, in accordance with embodiments of the present disclosure.

FIG. 6 is a schematic cross-sectional view of an embodiment of the RVPAS 60 in which the first outlet 62 is no longer blocked by the piston rod 70. As described above, as the driving fluid acts on the piston rod 70, the injectable 152 is driven toward the second outlet 86 and the resilient member 90 (not pictured) is compressed such that the piston rod 70 moves far enough into the injectable housing 66 to unblock the first outlet 82 to enable the driving fluid to act on the actuator 12 coupled to the valve 10, as illustrated by the arrow 170. As the driving fluid flows to the actuator 12, the actuator 12 cycles the valve. Because the injectable 152 has already been injected before cycling, the valve 10 is sufficiently protected from contaminants, such as particulate matter, because the injectable is utilized to clear the contaminants away from sensitive components.

The embodiment illustrated in FIG. 6 may be described as showing a compressed cavity 94. A length 172 is less than the length 92, illustrating the volume of the cavity 94 has been decreased due to the movement of the piston rod 70. It should be appreciated that the position of the piston rod 70 is for illustrative purposes only, and that the piston rod 70 may be further moved in the first direction 60 to provide a less-restricted flow path through the first outlet 82.

In certain embodiments, the resilient member 90 may act as a stop for the piston rod 70. For example, in embodiments where the resilient member 90 is a spring, as the spring is fully collapsed the piston rod 70 may be stopped from moving closer to the second outlet 86. However, in embodiments where full collapse of the spring 90 is undesirable, there may be additional features, such as mechanical stops and the like, arranged within the supply housing 64 and/or the injectable housing 66 to block movement of the piston rod 70 beyond a predetermined position. For example, the piston rod 70 may be configured to not extend far enough to block the second inlet 84.

Figure 7:
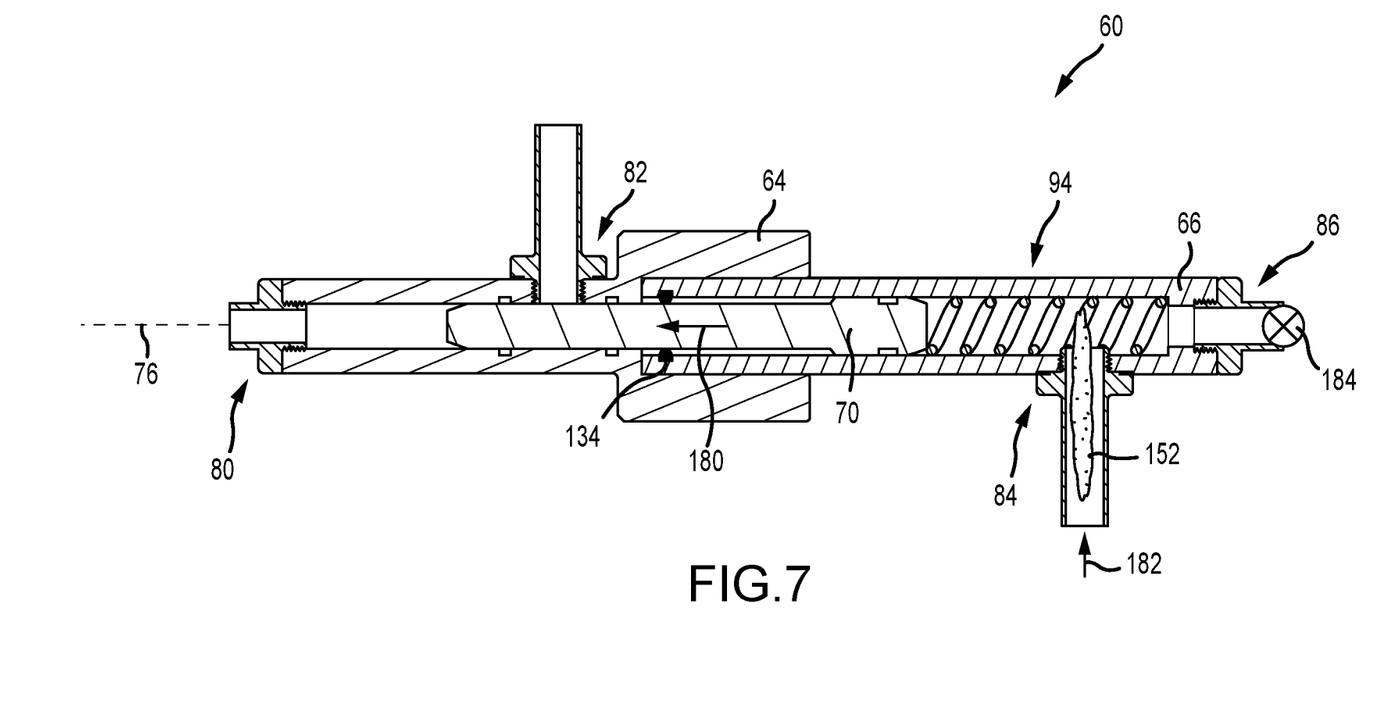
FIG. 7 is a schematic cross-sectional side view of the RVPAS of FIG. 1, in which the piston rod is undergoing a return stroke, in accordance with embodiments of the present disclosure.

FIG. 7 is a schematic cross-sectional view of an embodiment of the RVPAS 60 in which the piston rod 70 is moving toward the supply housing 64 in a second direction 180. As described above, as the piston rod 70 is driven toward the second outlet 86, the resilient member 90 is compressed. When the flow of driving fluid is stopped, the resilient member 90 biases the piston rod 70 back toward the supply housing 64 and drives the piston rod 70 out of the injectable housing 66. This motion creates a vacuum in the injectable housing 66, thereby drawing injectable 152 out of the injectable reservoir and into the cavity 94, as illustrated by the arrow 182. Accordingly, the RVPAS 60 is prepared for a subsequent activation because injectable 152 is within the cavity 94 and prepared to be injected into the valve 10. It should be appreciated that other mechanisms may be utilized to drive the piston rod 70 back toward the first inlet 80. For example, pressure from the valve 10 may be routed back to the RVPAS 60.

In the illustrated embodiment, a restricted flow valve 184 (e.g., a check valve) is arranged proximate the second outlet 86 to prevent injectable 152 from flowing out of the valve 10 and back into the cavity 94. For example, the restricted flow valve 184 may be a one way check valve that blocks flow toward the injectable housing 66 but allows flow out of the injectable housing 66. In this matter, the suction pressure generated by the return stroke of the piston rod 70 will be concentrated on the injectable reservoir to draw injectable 152 into the cavity 94.

As shown in FIG. 7, the wiper 134 is arranged in contact with the piston rod 70 to wipe residual injectable 152 off of the piston rod 70 before the piston rod 70 returns to the supply housing 64. As such, the injectable 152 will be blocked from entering the supply housing 64 and subsequently entering the actuator 12. In the illustrated embodiment, the piston rod 70 moves back into the supply housing 64 and blocks the first outlet 82. Accordingly, subsequent applications of driving fluid to the RVPAS 60 will first drive the injectable 152 into the valve 10 and then actuate the actuator 12. In this matter, components of the valve 10 can be preemptively protected before cycling of the valve 10.

Figure 8:
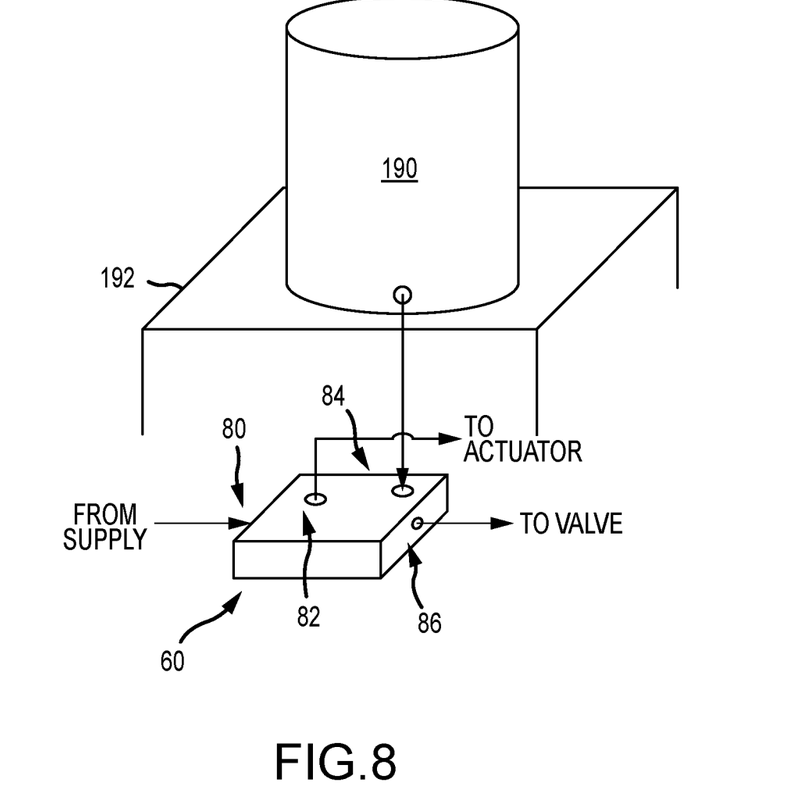
FIG. 8 is a schematic front perspective view of an embodiment of the RVPAS arranged proximate an injectable reservoir, in accordance with embodiments of the present disclosure.

FIG. 8 is a schematic perspective view of an embodiment of the RVPAS 60 arranged proximate an injectable reservoir 190. In the illustrated embodiment, the injectable reservoir 190 is arranged on a platform 192 at an elevation higher than the RVPAS 60 and is in the form of a drum. It should be appreciated that the injectable reservoir 190 may take different forms, such as a container, pressurized housing, or the like. As such, gravity will assist feeding the injectable 152 into the injectable housing 66. Moreover, as described above, in the illustrated embodiment the second inlet 84 is arranged at the upper end of the RVPAS 60. Such a set up would enable workers in the field to make fluid connections to the RVPAS 60 without worrying about the orientation of the RVPAS 60 or the like. For example, the RVPAS 60 may be marked with indicators, such as visual indicators, as to which flow lines are connected to which port. As a result, installation and maintenance is simplified, improving efficiencies in operation.

Figure 9:
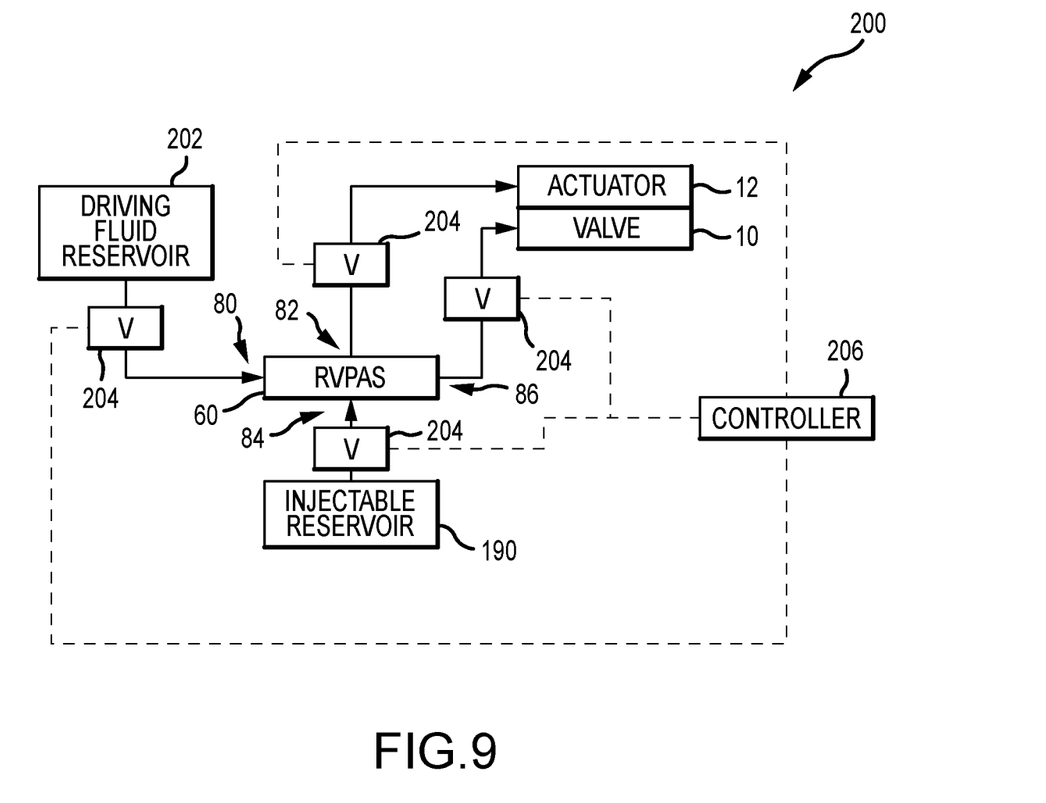
FIG. 9 is a schematic block diagram of an embodiment of a control system for the RVPAS, in accordance with embodiments of the present disclosure.

FIG. 9 is a schematic block diagram of an embodiment of a control system 200 that may be implemented with the RVPAS 60. As described above, the RVPAS 60 receives the driving fluid from a driving fluid reservoir 202, which may be a tank, compressed gas bottle, or the like. Furthermore, the RVPAS 60 receives the injectable 152 from the injectable reservoir 190. In various embodiments, other components, such as fluid movers and the like, may be associated with the reservoirs 190, 202. The RVPAS 60 redirects the driving fluid to the actuator 10 via the first outlet 82 and the injectable 152 to the valve 10 via the second outlet 86. In various embodiments, one or more valves 204 may be associated with each of the inlets and outlets of the RVPAS 60. For example, as described above, the valves 204 may include the restricted flow valves 154, 184, as well as other restricted flow valves that may be arranged throughout the system. Furthermore, in embodiments, the valves 204 may be controllable or actuated valves that are controlled by signals received from a controller 206. The controller 206 may include a processor and memory and may execute instructions stored on the memory via the processor. In various embodiments, the controller 206 receives signals, for example from sensors, and thereafter transmits instructions to the valves 204. For example, the controller 206 may receive instructions that the valve 10 is to be cycled without injecting the injectable 152. As a result, a signal may be transmitted to the valves 204 associated with the second inlet 84 and/or the second outlet 86 to close the valves to block movement of the injectable 152. As described above, the conduits 62 coupled to the first outlet 82 and/or the second outlet 86 may include vents or flow back lines to avoid overpressure scenarios. In this manner, the controller 206 may regulate operation of the RVPAS 60 such that the RVPAS 60 may be able to operate in a variety of modes, such as cycling the valve 10 without injecting, injecting without cycling the valve 10, and injecting and cycling the valve 10.

It should be appreciated that, in various embodiments, the RVPAS 60 may be a separate component that is coupled to the actuator 12 and/or the valve 10. For example, the RVPAS 60 may be a support component that enables retrofitting existing valves in the field. Furthermore, in various embodiments, the RVPAS 60 may be incorporated into the actuator 12 and/or the valve 10. In this manner, valves 10 may be distributed with the capabilities of the RVPAS 60 already integrated.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A valve assembly comprising:
a supply housing comprising a first bore;
an injectable housing coupled to the supply housing and comprising a second bore, the first bore and the second bore being axially aligned;
a piston extending through at least a portion of the first and second bores, the piston being reciprocable axially along a longitudinal axis of the first and second bores;

a first inlet at a first end of the supply housing, the first inlet directing a working fluid toward a first end of the piston;
a second inlet extending through the injectable housing toward a cavity of the second bore, the cavity receiving an injectable material; and
a second outlet at a second end of the injectable housing, the second outlet directing the injectable material out of the injectable housing as the piston moves axially along the longitudinal axis to drive the injectable material out of the cavity.

2. The valve assembly of claim 1, further comprising:
a recessed opening at a second end of the supply housing, the recessed opening receiving a first end of the injectable housing.

3. The valve assembly of claim 1, further comprising:
a first outlet of the supply housing, the first outlet arranged downstream of the first inlet and directing the working fluid out of the supply housing.

4. The valve assembly of claim 3, wherein the first outlet is blocked by the piston until the piston moves a predetermined distance along the axis.

5. The valve assembly of claim 1, further comprising:
a resilient member within the second bore biasing the piston away from the second outlet.

6. The valve assembly of claim 1, further comprising:
a dynamic seal arranged along at least a portion of the piston, the dynamic seal moving with the piston as the piston reciprocates within the first and second bores.

7. The valve assembly of claim 1, further comprising:
a recess formed in the supply housing; and
a static seal positioned in the recess, the static seal being linearly stationary relative to the piston as the piston moves along the axis.

8. The valve assembly of claim 1, further comprising:
an expanded portion at a second end of the piston, the expanded portion having a larger diameter than the first end of the piston.

9. The valve assembly of claim 1, further comprising:
a wiper extending into the second bore, the wiper bearing against at least a portion of the piston to clear debris from the piston as the piston moves along the axis.

10. A valve assembly for injecting an injectable material into at least a portion of a valve, the valve assembly comprising:
a supply housing, comprising:
a first inlet at a first end, the first inlet receiving a working fluid;
a second end opposite the first end; and
a first outlet between the first end and the second end, the first outlet directing the working fluid out of the supply housing;
an injectable housing, comprising:
a first end coupled to the supply housing at the second end;
a second outlet at a second end;
a second inlet between the first end and the second end;
a cavity formed within a body of the injectable housing, the cavity receiving the injectable material via the second inlet; and
a piston arranged in at least a portion of both the supply housing and the injectable housing, the piston moving axially along a longitudinal axis;
wherein the working fluid is configured to move the piston toward the second end such that the piston drives the injectable material out of the injectable housing via the second outlet.

11. The valve assembly of claim 10, wherein the valve assembly is coupled to the valve, the working fluid providing activation energy for an actuator coupled to the valve and the injectable material being directed toward a cavity within the valve.

12. The valve assembly of claim 10, further comprising:
a restricted flow valve arranged at at least one of the first outlet, the second outlet, and the second inlet, the restricted flow valve enabling flow in one direction and blocking flow in an opposite direction.

13. The valve assembly of claim 10, wherein the second inlet is coupled to an injectable reservoir storing the injectable material, the injectable material being driven to the cavity via a vacuum force in the cavity as the piston moves in a direction away from the second outlet.

14. The valve assembly of claim 10, further comprising:
a wiper extending into the second bore, the wiper bearing against at least a portion of the piston to clear debris from the piston as the piston moves along the axis.

15. The valve assembly of claim 10, wherein at least a portion of the piston blocks the first outlet until the piston has moved a predetermined distance.

16. A valve assembly for injecting an injectable material into at least a portion of a valve, the valve assembly comprising:
a supply housing, comprising:
a first inlet at a first end of the supply housing, the first inlet receiving a working fluid;
a second end of the supply housing opposite the first end of the supply housing; and
a first outlet directing the working fluid out of the supply housing;
an injectable housing, comprising:
a first end of the injectable housing coupled to the supply housing at the second end of the supply housing;
a second outlet at a second end of the injectable housing;
a second inlet between the first end of the injectable housing and the second end of the injectable housing;
a cavity formed within a body of the injectable housing, the cavity receiving an injectable material via the second inlet; and
a piston arranged in at least a portion of both the supply housing and the injectable housing, the piston blocking the first outlet until the working fluid applies a force to move the piston at least a predetermined distance along an axis.

17. The valve assembly of claim 16, wherein the piston creates a suction pressure in the cavity as the piston moves in a second direction away from the second outlet, the suction pressure acting on the second inlet to drive the injectable material into the cavity.

18. The valve assembly of claim 16, further comprising:
a resilient member positioned within the cavity, the resilient member biasing the piston away from the second outlet.

19. The valve assembly of claim 16, further comprising:
a recess formed in the supply housing; and
a static seal positioned in the recess, the static seal being linearly stationary relative to the piston as the piston moves along the axis.

20. The valve assembly of claim 16, further comprising:
a dynamic seal arranged along at least a portion of the piston, the dynamic seal moving with the piston as the piston moves along the axis.

* * * * *